United States Patent [19]

D'Angelo et al.

[11] Patent Number: 4,927,796

[45] Date of Patent: May 22, 1990

[54] COMPOSITIONS FOR PURIFYING LIQUIDS

[75] Inventors: Philip J. D'Angelo, Glen Mills; Richard Hetherington, Glenside; Joseph J. Rogan, Levittown, all of Pa.

[73] Assignee: Epicor Incorporated, Linden, N.J.

[21] Appl. No.: 310,221

[22] Filed: Feb. 13, 1989

Related U.S. Application Data

[60] Division of Ser. No. 63,177, Jun. 17, 1987, Pat. No. 4,853,130, which is a continuation-in-part of Ser. No. 811,525, Dec. 20, 1985, abandoned, which is a continuation-in-part of Ser. No. 640,528, Aug. 14, 1984, abandoned.

[51] Int. Cl.$^5$ ............................................. B01J 20/18
[52] U.S. Cl. ...................................................... 502/62
[58] Field of Search .......................................... 502/62

[56] References Cited

U.S. PATENT DOCUMENTS

| 3,352,424 | 11/1967 | Guebert et al. | 502/62 |
| 4,316,819 | 2/1982 | Tu et al. | 502/62 |
| 4,337,171 | 6/1982 | Kulprathipanja et al. | 502/62 |
| 4,440,867 | 4/1984 | Sabherwal | 502/62 |
| 4,614,591 | 9/1986 | Jorgensen | 502/62 |

Primary Examiner—Carl F. Dees
Attorney, Agent, or Firm—James A. Drobile; Raymond G. Arner

[57] ABSTRACT

A process for the separation of radioisotopes and stable isotopes and other deleterious materials from radioactive waste and other liquids, wherein the waste stream is passed through a filter/demineralizer septum screen pre-coated with a mixture of finely-divided zeolitic material and finely-divided ion-exchange resin material.

20 Claims, No Drawings

COMPOSITIONS FOR PURIFYING LIQUIDS

This is a Division, of application Ser. No. 07/063,177, filed June 17, 1987, now U.S. Pat. No. 4,853,130 which is a continuation-in-part of prior U.S. application Ser. No. 06/811,525 filed Dec. 20, 1985, and now abandoned, which is a continuation-in-part of U.S. application Ser. No. 06/640,528 filed Aug. 14, 1984, now abandoned.

BACKGROUND OF THE INVENTION

This invention relates to an improved method for eliminating radioactive and stable isotopes, and other deleterious materials including certain organic materials, from radioactive waste liquids and other liquids containing them. More particularly, this invention relates to the elimination of such deleterious materials from liquids be a novel filtration method utilizing novel filter/demineralizer pre-coating compositions.

The handling and disposal of radioactive waste materials is a continuing and growing problem in nuclear energy installations and operations. As nuclear energy use increases, the need for more efficient waste handling techniques is being raised to a higher priority.

Most radioactive waste exists in liquid form, obtained, for example, during the normal operation of nuclear reactors, and in the manipulation and handling of radioisotopes. Many of the activation fission and corrosion products present in radioactive waste liquids have relatively short half-lives and present no problems with regard to safe disposal. However, disposal problems are quite in evidence when the waste liquids contain such radioisotopes as radiocesium and radiocobalt, which have substantially longer half-lives and occur in higher concentrations in nuclear facilities.

Ultimate disposition of radioisotope elements in radioactive wastes is customarily effected by burial in the ground. For ground burial, the waste must be a solid or, in the case of a liquid, be solidified.

Various methods have been suggested in the past for effecting concentration of radioactive liquid waste, examples of which are simple evaporation of the liquid components, precipitation of the radioactive elements, and fixation of the radioactive elements on solids. However, utilization of prior art techniques have not proven entirely satisfactory in large scale operations. For example, the concentration of radioactive liquid wastes, particularly low-level wastes, by evaporation is economically disadvantageous when large volumes of liquid waste are processed. Problems also are experienced with foaming, carryover of volatile fractions, and the corrosive and scaling nature of the waste on evaporator components.

One of the most practical prior art methods used to treat liquid radioactive wastes prior to disposal has been the fixation of the radioactive elements in the liquid waste on a solid, as by adsorption or ion-exchange, permitting the liquid to be safely released to normal environmental liquid waste disposal sites or returned to the primary plant system as make-up water.

In accomplishing the separation of radioactive elements by such methods, the contact of the liquid waste with certain naturally-occurring materials, such as inorganic zeolites, which exhibit capability in the selective adsorption of radioactive elements, has been utilized. Recommended for the fixation of radiocesium in the past have been such materials as montmorillonite, erionite and the like. Naturally-occurring materials, such as these, generally exhibit limitations as adsorbent materials due to such factors as impurities and composition inconsistencies. These properties tend to result in less than desirable economic advantages when purification is attempted and, in some instances, loss of stability under processing conditions. A problem that has existed in the use of inorganic zeolites is that the solubility of these materials is such that undesirable contaminants were introduced when treating high purity streams. As a result it was necessary for a separate ion exchange resin unit to be used downstream for the removal of these contaminants, increasing the cost of treatment considerably.

In view of the foregoing, it is an object of this invention to provide an improved method for the removal of radioisotopes and stable isotopes from radioactive waste liquids.

Another object of this invention is to provide an improved method which is particularly effective in the removal of radioisotopes such as cesium, cobalt and other ionic constituents and organic molecules from radioactive waste liquids containing the same.

Still another object of the invention is to provide a method for the removal of radioisotopes and stable isotopes from radioactive waste liquids through the use of a single processing step.

Still another object of this invention is to provide a method by which organic molecules in solution can be removed in a pre-coated filter-demineralizer through the use of zeolitic and ion exchange resin materials.

It is a further object of this invention to provide an improved method for the removal of radioisotopes and stable isotopes from radioactive waste liquids wherein separation is effected both more efficiently and more economically than is attainable with prior art methods.

Further objects and advantages of the invention will become apparent from the description which follows.

SUMMARY OF THE INVENTION

This invention is based upon the discovery that radioactive and stable isotopic materials, particularly cesium and cobalt, may be effectively removed from radioactive waste liquids by passing the waste liquid fluid stream through a filter/ demineralizer unit pre-coated with a mixture of a zeolitic material and an ion-exchange resin material, both components present in the mixture in finely-divided form and the pre-coat medium constituting a floc. It has been found that the combination of the zeolite material and the ion exchange resin material, when used in the form of a floc and as the pre-coat medium, produces a synergistic effect with respect to the removal of the radioactive and stable isotopic materials, over the combined effect of both materials when used separately.

Following filtration/demineralization, the radioisotope and stable isotope-depleted liquid filtrate may be safely discharged to waste, or it may be returned to the system as make-up water. The spent filter pre-coat medium containing the deposited radioisotopes and other isotopic material can be sealed in a suitable container and then ultimately disposed of by conventional burial methods known in the art. By the use of the present process, the volume of radioactive waste ultimately to be disposed of is reduced very substantially.

Use of a selected type of zeolitic material in the practice of this invention, specifically, a silicate type zeolitic material, also permits of the removal of certain deleterious organic materials from a liquid containing them. Organic materials which can be so removed are those that exhibit some significant degree of ionization, such as, for example: phenol; formic, propionic and butyric acids; and the naturally-occurring fulvic and humic acids. Such organic materials on occasion are present in cooling water, boiler feed water, and other and similar streams.

DETAILED DESCRIPTION OF THE INVENTION

The novel filter/demineralizer pre-coating composition of the present invention comprises an admixture of (A) from about 25 to about 75 percent by weight of a suitable zeolitic material and (B) from about 75 to about 25 percent by weight of an ion-exchange resin material selected from the group consisting of: (a) an admixture of a strongly acidic cation exchange resin and a strongly basic anion exchange resin; (b) an admixture of a weakly acidic cation exchange resin and a strongly basic anion exchange resin; (c) an admixture of a strongly acidic cation exchange resin and a weakly basic anion exchange resin; and (d) a strongly basic anion exchange resin.

In formulating the filter/demineralizer pre-coating composition, any natural or synthetic zeolitic material which is sufficiently insoluble under the conditions of use can generally be employed. Among naturally-occurring zeolitic materials found particularly suitable for the practice of the present invention are Faujasite, Chabazite and the like. The preferred naturally-occurring zeolite will depend on the ions or other deleterious materials to be removed and the commercial availability of the zeolitic material.

Synthetic zeolitic materials, as stated, may also be advantageously employed in the present compositions and process. Particularly useful are the zirconium phosphates. Zirconium phosphate in various forms functions as an ion-exchanger and may be prepared by many different processes known to the art. A listing of the different types of zirconium phosphates which function as ion-exchangers appears in "Inorganic Ion-Exchange Materials", edited by A. Clearfield, and published by Chemical Rubber Company, the disclosure of which is incorporated herein by reference. Particularly advantageous, when zirconium phosphates are employed in the present compositions and process, is the form of zirconium phosphate designated as alpha-zirconium phosphate. The preparation and characterization of alpha-zirconium phosphate is also detailed in "Inorganic Ion-Exchange Materials", the disclosure of which is incorporated herein by reference.

For the removal of organic materials, synthetic zeolitic materials of the silicate type are to be particularly preferred. A synthetic zeolitic material of this type which generally is suitable for use in the pre-coat compositions of the present invention, and which is particularly preferred for use in connection with the removal of organic materials, is that zeolitic material of the silicate type which is commercially available from the Linde Division of Union Carbide Corporation under the trade designation, "S-115".

In general, in the practice of the present invention it has been observed that synthetic zeolitic materials provide better flow characteristics. Natural zeolitic materials, however, are generally more stable in acidic environments. Further, more particularly advantageous are the hydrogen forms of the selected zeolitic material, as converted from the sodium or calcium form by means of an acid treatment wherein the zeolitic material is contacted with dilute hydrochloric acid, decanted and rinsed free of residual acid with de-ionized water.

Commercially-available natural zeolitic materials which have been found to function effectively in the present compositions and process include Union Carbide Corporation, Linde Division's "Zeolite IE-90", an alkali metal alumino silicate primarily of the Chabazite structure type, supplied in the salt form and partially converted to the acid form prior to use, and Union Carbide, Linde Division's "A-50", a Faujasite or an alkali metal alumino silicate of the type "A" crystal structure and supplied in the salt form and partially converted to the acid form prior to use.

Prior to incorporation into the pre-coat composition, a zeolite in the salt form is allowed to soak in from about 1.0 to about 3.0% by volume of hydrochloric acid in water, for about 12 to about 24 hours, and is then decanted and rinsed free of residual acid by de-ionized water.

Two or more suitable zeolitic materials may be used together as the zeolitic material component of the pre-coat composition, if desired.

For use in the present composition and process, the particle size of the powdered zeolitic material is adjusted by suitable and conventional particle reduction means, such as back washing, decantation and the like, to a particle size on the order of from about 1 to about 80 microns, and preferably on the order of from about 5 to about 10 microns. The use of materials having a particle size less than about 1 micron can result in filtration difficulties, such as inhibition of the floc formation which has been found to be essential to the practice of the invention. Thus, it has been found that powdered inorganic zeolites can be successfully used as a pre-coat medium on a filter/demineralizer element only if they are incorporated in a floc. Undesirably undersized particles either may be removed, or the adverse effect thereof negated by the inclusion in the composition of a minor amount of a polyelectrolyte floccing agent such as "NATRON 6035", a liquid synthetic amphoteric polyelectrolyte available commercially from National Starch a Chemical Corporation. In addition, certain selected cationic, anionic and nonionic polyelectrolytes are also suitable for use as floccing agents in the practice of the present invention. Generally, it has been found that, in those instances where zeolitic materials of approximately one micron in particle size are present, the inclusion of not more than about 0.01 parts by weight of a suitable floccing agent per hundred parts of zeolitic material gives good results. The floccing agent can be conveniently included in the composition by means of an appropriately sized volumetric dispensing device.

The second essential component of the pre-coat composition, to be employed in conjunction with the zeolitic material, is an ion-exchange resin material component selected from the group consisting of: (a) an admixture of a strongly acidic cation exchange resin and a strongly basic anion exchange resin; (b) an admixture of a weakly acidic cation exchange resin and a strongly basic anion exchange resin; (c) an admixture of a strongly acidic cation exchange resin and a weakly basic anion exchange resin; and (d) a strongly basic anion exchange resin.

The term "strongly acidic cation exchange resin", as used herein, refers to and includes those cationic ion-exchange resins having sulfonic acid groups as the principal functional groups of the resin. Examples of strongly acidic cation exchange resins are "AMBERLITE IR-120", "AMBERLITE IR-122", "AMBERLITE IR-124" and "AMBERLITE-200", all commercially available in bead form from Rohm & Haas Company; "DOWEX HCR", "DOWEX HGR", "DOWEX HDR" and "DOWEX MPC-1", all commercially available in bead form from Dow Chemical Company. An example of a commercially-available strongly acidic cation exchange resin in powdered form is "PD-3" Resin, commercially available from Epicor Incorporated, and having a sulfonic acid functionality on a matrix of polystyrene cross-linked with divinylbenzene, and in the hydrogen form.

The strongly acidic cation exchange resins suitable for use in the present compositions and process are those having a particle size on the order of from about 30 to about 250 microns, and preferably from about 30 to about 150 microns.

Two or more suitable resins may be admixed to obtain the strongly acidic cation exchange resin component of the pre-coat composition, if desired.

The term "strongly basic anion exchange resin" as used herein refers to and includes those anionic ion-exchange resins having quaternary ammonium groups as the principal functional groups. Examples of strongly basic anion exchange resins are "AMBERLITE IRA-400", "AMBERLITE RA-410", "AMBERLITE IRA-900", all commercially available in bead form from Rohm & Haas Company; "DOWEX SBR", "DOWEX SAR", and "DOWEX MPA-1", all commercially available in bead form from Dow Chemical Company. An example of a suitable commercially-available strongly basic anion exchange resin in powdered form is "PD-1" Resin, manufactured by Epicor, Incorporated, having a quaternary ammonium functionality on a matrix of polystyrene cross-linked with divinylbenzene in the hydroxide form.

The strongly basic anion exchange resins used in the present compositions and process are those having a particle size on the order of from about 30 to about 250 microns, preferably from about 30 to about 150 microns.

Two or more suitable resins may be admixed to obtain the strongly basic anion exchange resin component of the pre-coat compositions, if desired.

Mixtures of strongly acidic cationic, and strongly basic anionic, ion-exchange resines are commercially available from Epicor, Incorporated. One such formulation, designated "EPIFLOC 101-H" Resin, contains about 25 percent by weight of the powdered cationic resin, about 25 percent by weight of the powdered anionic resin and about 50 percent by weight of an alpha-cellulose fiber inert filter aid. A second such Epicor formulation, designated "EPIFLOC 21-H" Resin, contains about 30 percent by weight of the powdered cationic resin, about 37 percent by weight of the powdered anionic resin, and about 33 percent by weight of fibrous alpha-cellulose as an inert filter aid. Each of these formulations is suitable for use as the ion-exchange resin material in the present compositions and process.

The term "weakly acidic cation exchange resin" as used herein refers to and includes those cationic resins having carboxylic acid groups. Exemplary of weakly acidic cation exchange resins is "AMBERLITE IRC-50", which is available commercially in bead form from Rohm & Haas Company. The aforementioned materials, furnished as they are in large bead form, must be ground or otherwise reduced to a suitable particle size.

The weakly acidic cation exchange resins which are suitable for use in the compositions and process of the present invention are those having a particle size on the order of from about 30 to about 250 microns, preferably from about 30 to about 150 microns.

Two or more suitable resins may be admixed to obtain the weakly acidic cation exchange resin component of the pre-coat composition, if desired.

The term "weakly basic anion exchange resin" as used herein refers to and includes those resins of variable matrix having primary, secondary, or tertiary amine groups, or combinations thereof, as the principal functional groups. Commercially-available weakly basic anion exchange resins include Rohm and Haas' "IRA4-B", and Rohm and Haas' "IRA-93".

The weakly basic anion exchange resine suitable for use in the compositions and method of the present invention are those having a particle size on the order of from about 30 to about 250 microns, and preferably from about 30 to about 150 microns.

The ion-exchange resin components of the pre-coat composition may be added to the zeolitic component separately, or they may be added to the zeolitic component as a mixture. Preferably, they are added separately and blended by the use of conventional blending techniques and apparatus. If necessary, a polyelectrolyte floccing agent, as previously described, can conveniently be added at this stage.

Reduction in particle size of the various components is also accomplished by conventional techniques and apparatus.

The relative proportions by weight of the ion-exchange resin components in the ion-exchange resin material of the pre-coat composition may vary over a wide range, to produce mixtures of about 1:9 to 9:1 strongly acidic cationic:strongly basic anionic; 1:9 to 9:1 strongly acidic cationic weakly basic anionic; and 1:9 to 9:1 weakly acidic cationic:strongly basic anionic.

In preparing the zeolite:ion-exchange resin pre-coating composition, the pre-coat composition is conveniently produced by blending the zeoliteion-exchange resin admixture in a blending tank with sufficient water to produce a 0.5 to 10 weight percent slurry of the powdered solids in water. The pre-coat compositions found useful in the practice of the present invention are those containing from about 25 to about 75 percent by weight zeolitic component, and preferably from about 25 to about 50 percent, based on the dry weight of the composition.

The pre-coat composition is applied to a conventional filter/demineralizer screen or septum by recirculating a well mixed slurry of powdered ion-exchange material:zeolitic material in water through the filter/demineralizer septum, and allowing the suspended material to pre-coat on the septum.

The aqueous pre-coat composition slurry, formulated to contain from about 0.5 to about 10 weight percent solids, and preferably from about 0.5 to about 4 percent solids, is deposited on the filter septum or screen to produce a pre-coat loading of from about 0.05 to about 0.4, and preferably from about 0.1 to about 0.3, pounds of solid pre-coat composition per square foot of filter surface area.

In operation, the flow rate of radioactive waste liquid through the pre-coated filter is on the order of from about 0.5 to about 4 gallons per minute per square foot of filter surface area.

In order to illustrate a specific embodiment of the practice of the present invention, a filter pre-coat composition in accordance with the invention is prepared, comprising a natural zeolitic material, a strongly acidic cation exchange resin and a strongly basic anion exchange resin. The zeolitic material component is an alkali metal alumino silicate, primarily of the Chabazite structural type, which is obtained commercially from the Linde Division of Union Carbide Corporation under the trade designation "Zeolite IE-90". This zeolitic material is supplied in the sodium form, and prior to its use in the practice of the invention is converted at least in substantial part to the hydrogen form by first soaking it for approximately twenty hours in a 2.0 volume percent aqueous solution of hydrochloric acid, and then, after decanting the aqueous acid solution, removing residual acid from the zeolitic material by rinsing with water. The zeolitic material is in powdered form, with particles ranging in diameter from about 5 to about 10 microns, and is substantially free of particles less than one micron in diameter.

The ion-exchange resin material component of the pre-coat composition employed in this embodiment is commercially obtained from Epicor, Incorporated, under the trade designation "EPIFLOC 101-H", and consists of equal dry weights of the ion exchange resin material and an inert, fibrous alpha-cellulose material. The ion exchange resin portion of this product consists of equal dry weights of a strongly acidic cation exchange resin in hydrogen form and a strongly basic anion exchange resin in hydroxide form. The particle sizes of both ion exchange resins are in the range of from about 30 microns to about 150 microns in diameter, while the particles of the alpha-cellulose fibrous material average approximately 80 microns in length and 17 microns in width. As indicated, the weight ratio of the two ion exchange resins is 1:1.

The zeolitic material, after acid treatment to convert it at least in substantial part to the hydrogen form, and the ion exchange resin material, are added, in a zeolite:resin weight ratio of 1:3, and together with water in an amount sufficient to produce an aqueous slurry containing about five percent by weight of the dry solid materials in water, to a blending tank and agitated for a period of time sufficient to produce a well-mixed and uniform slurry capable of forming a floc when being applied to the filter septum. This slurry contains the pre-coat composition of the invention.

The pre-coat composition prepared as above described is then applied to the vertical or horizontal screen or septum of a filter/demineralizer apparatus of the type conventionally used to remove low-level radioactivity from fluid waste streams at facilities such as nuclear power plants. Application of the pre-coat medium is effected by continuously recirculating the slurry of flocculated zeolitic material and ion exchange resin material in water through the filter/demineralizer septum, whereby the suspended solid material is gradually pre-coated out on the septum. Such application is continued until a pre-coat loading of about 0.2 pounds (dry basis) of solid pre-coat medium per square foot of filter surface area is achieved.

The filter/demineralizer, pre-coated as above described with the novel pre-coat composition of the present invention, is then employed in a conventional manner to remove radioactive and stable isotopes and other deleterious materials including suspended solids from a fluid waste stream from a facility such as a nuclear power plant. The fluid waste stream, containing cesium, cobalt and other isotopes and suspended solids, is passed through the pre-coated filter/demineralizer in conventional manner, without recirculation, and at a uniform flow rate of about three gallons per minute per square foot of filter surface area. Samples of the effluent stream are collected at timed intervals, and these samples are analyzed to determine radioactivity and suspended solids content of the effluent stream in comparison with the fluid waste stream entering the filter/demineralizer. It is found that, through the use of the method and pre-coat composition of the present invention, radioactive isotopes such as those of cesium and cobalt, and other active and stable isotopes and suspended solids, are removed to a substantially greater degree, and for a significantly longer period of time, than has heretofore been achieved with conventional pre-coat filtration methods and compositions.

When the method of the present invention is practiced as above described, and with other novel pre-coat compositions of the invention as herein described, substantially similar results are achieved.

In order to demonstrate the unexpected and superior results which are achieved through the practice of this invention, the effectiveness of the novel pre-coat filtration method and compositions of the present invention in removing radioactive and stable isotopes and suspended solids from a particular fluid waste stream was determined and compared with the effectiveness, similarly determined, of the conventional pre-coat technique employing a conventional pre-coat composition. Four experiments were conducted.

In the experiment reflecting conventional practice, the pre-coat medium consisted of the ion exchange resin material/ alpha-cellulose fiber material previously identified as "EPIFLOC 101-H", which is commercially available, and was obtained, from Epicor, Incorporated. As previously described, this resin/fiber mix consisted of one part by weight of alpha-cellulose fibers approximately 80 microns in length and 17 microns in width, and one part by weight of an equal mixture by weight of a strongly acidic cation exchange resin in hydrogen form and a strongly basic anion exchange resin in hydroxide form, both ion exchange resins being in powdered form and having particle sizes in the range of from about 30 microns to about 150 microns in diameter.

In the experiment reflecting the practice of the present invention, the pre-coat composition consisted of an admixture of one part by weight of the natural inorganic zeolitic material previously identified as "Zeolite IE-90". in powdered form; one part by weight of the powdered strongly acidic cation exchange resin, in the hydrogen form, previously identified as "PD-3" Resin; and two parts by weight of the powdered strongly basic anion exchange resin, in the hydroxide form, previously identified as "PD-1" Resin. The pre-coat composition contained no alpha-cellulose fibrous material. The zeolitic material is commercially available and was obtained from the Linde Division of Union Carbide Corporation, and prior to its admixture, was converted at least in substantial part from the sodium form to the acid form by contact with a dilute aqueous solution of hydrochloric acid, substantially as previously described. The zeolitic material is in powdered form, with particles ranging in diameter from about 5 to about 10 microns, and is substantially free of particles less than one micron in diameter. The ion exchange resin materials are both commercially available and were obtained from Epicor, Incorporated. They both are in powdered form, having particle sizes in the range of from about 30 microns to about 150 microns in diameter.

In order to determine and isolate any possible separate effectiveness of the alpha-cellulose fibrous material contained in the conventional "EPIFLOC 101-H" ion exchange resin/fiber mix, or of the zeolitic component of the zeolitic/ion exchange resin pre-coat composition of the present invention, two additional experiments were conducted in which the pre-coat composition consisted of the fibrous material by itself or the zeolitic material by itself.

In each of the four experiments, the filter element consisted of a pre-tared sheet of Whatman No. 41 filter paper supported on and mounted in a Millipore in-line filter holder. In each experiment, also, the pre-coat composition under test was slurried with de-ionized water, and the slurry was applied to the top side of the horizontally-oriented filter element to a depth necessary to provide the desired loading of the pre-coat composition on the filter element. Excess water was removed from the pre-coat medium by application of a vacuum to the underside of the filter element, and the filter element was weighed to determine the wet weight of the pre-coat medium. After the desired loading of the pre-coat medium on the filter element had approximately been achieved, the filter element was positioned in the main conduit of the test apparatus. Fluid waste water from a nuclear power plant, containing various radioisotopes and exhibiting a conductivity of about 8 micromhos per centimeter at 25° C., was placed in a storage tank and fed by gravity through the test apparatus including the pre-coated filter element. The rate of flow of the fluid waste stream was controlled by a valve positioned in the main conduit upstream of the pre-coated filter element. The conductivity of the effluent stream from the filter element was continuously measured by a conductivity cell positioned in the conduit downstream of the filter element, and samples of such effluent stream were periodically taken and submitted for isotopic analysis.

The following experimental results were obtained:

TABLE I

Pre-Coat Medium: Resin/Fiber Mix ("EIPFLOC 101-H")
Wt. of Pre-Coat: 3.36 gms. (Wet)

| Sample Time (elapsed minutes) | Conductivity (micromhos per cm. at 25° C.) | Flow Rate (mls per min.) |
|---|---|---|
| 0 (Start) | 8.3 (Feed) | — |
| 5 | 0.10 (Effluent) | 50 |
| 10 | 0.14 (Effluent) | 50 |
| 15 | 0.22 (Effluent) | 50 |
| 20 | 0.31 (Effluent) | 50 |
| 25 | 0.42 (Effluent) | 50 |
| 30 | 0.53 (Effluent) | 50 |
| 35 | 0.64 (Effluent) | 50 |

TABLE II

Pre-Coat Medium: Alpha-Cellulose Fiber Material (as present in "EPIFLOC 101-H" Resin/Fiber Mix)
Wt. of Pre-Coat: 1.44 gms. (Wet)

| Sample Time (elapsed minutes) | Conductivity (micromhos per cm. at 25° C.) | Flow Rate (mls per min.) |
|---|---|---|
| 0 (Start) | 8.0 (Feed) | — |
| 5 | 8.0 (Effluent) | 50 |
| 10 | 8.0 (Effluent) | 50 |
| 15 | 8.0 (Effluent) | 50 |
| 20 | 8.0 (Effluent) | 50 |
| 25 | 8.0 (Effluent) | 50 |
| 30 | 8.0 (Effluent) | 50 |

TABLE III

Pre-Coat Medium: Zeolite ("IE-90") and Resin Mix ("PD-3" and "PD-1")
Wt. of Pre-Coat: 3.33 gms. (Wet)

| Sample Time (elapsed minutes) | Conductivity (micromhos per cm. at 25° C.) | Flow Rate (mls per min.) |
|---|---|---|
| 0 (Start) | 8.1 (Feed) | — |
| 5 | 0.092 (Effluent) | 45 |
| 10 | 0.077 (Effluent) | 40 |
| 15 | 0.074 (Effluent) | 35 |
| 20 | 0.073 (Effluent) | 25 |
| 25 | 0.072 (Effluent) | 25 |
| 30 | 0.071 (Effluent) | 20 |
| 35 | 0.071 (Effluent) | 20 |

TABLE IV

Pre-Coat Medium: Zeolite ("IE-90")
Wt. of Pre-Coat: 1.46 gms. (Wet)

| Sample Time (elapsed minutes) | Conductivity (micromhos per cm. at 25° C.) | Flow Rate (mls per min.) |
|---|---|---|
| 0 (Start) | 8.0 (Feed) | — |
| 5 | 100.0 (Effluent) | 8.0 |
| 10 | 150.0 (Effluent) | 8.0 |
| 15 | 170.0 (Effluent) | 8.0 |
| 20 | 175.0 (Effluent) | 8.0 |
| 25 | 160.0 (Effluent) | 6.0 |
| 30 | 160.0 (Effluent) | 6.0 |

The foregoing experimental results demonstrate that the alpha-cellulose fiber material present in the resin/fiber mix designated "EPIFLOC 101-H", does not contribute to the removal of ionic species by that resin/fiber mix as a whole, and that, accordingly, it is the ion exchange resin component of that resin/fiber mix which, alone, is effective in that mix in removing ionic species. The above experimental results further demonstrate that the zeolitic material present in the novel zeolite/resin mix pre-coat composition of the invention, when used alone, ndt only does not reduce the content of ionic species in the waste stream, but actually increases conductivity. However, and surprisingly, when the zeolitic material is in combination with the ion exchange resin material in the pre-coat composition of the present invention, the conductivity of the waste stream is reduced to a degree substantially greater, and for a substantially greater period of time, than what might be expected from the separate effectiveness of the zeolitic material and the conventional resin/fiber material as pre-coat media.

The results of the isotopic analyses performed on periodically-taken samples of the influent and effluent streams during the above-described four experiments are set forth in Table V below:

TABLE V

Isotopic Analyses
Radioactivity (microcuries per mililiter)

| Sample Time (elapsed minutes) | Cobalt$^{60}$ | Zinc$^{65}$ | Cesium$^{134}$ | Cesium$^{137}$ |
|---|---|---|---|---|
| Pre-Coat Medium: Resin/Fiber Mix ("EPIFLOC 101-H") | | | | |
| 0 (Start-Feed) | 7.06 × 10$^{-5}$ | 5.98 × 10$^{-5}$ | — | 2.95 × 10$^{-5}$ |
| 10 | <1.00 × 10$^{-8}$ | <1.00 × 10$^{-8}$ | — | <1.00 × 10$^{-8}$ |
| 20 | <1.00 × 10$^{-8}$ | <1.00 × 10$^{-8}$ | — | <1.00 × 10$^{-8}$ |
| 30 | 7.35 × 10$^{-4}$ | <1.00 × 10$^{-8}$ | — | <1.00 × 10$^{-8}$ |
| Pre-Coat Medium: Alpha-Cellulose Fiber Material (as present in "EPIFLOC 101-H" Resin/Fiber Mix) | | | | |
| 0 (Start-Feed) | 3.64 × 10$^{-5}$ | 2.36 × 10$^{-5}$ | 8.66 × 10$^{-6}$ | 1.15 × 10$^{-5}$ |
| 10 | 8.18 × 10$^{-6}$ | 1.37 × 10$^{-5}$ | 1.00 × 10$^{-8}$ | 1.64 × 10$^{-5}$ |
| 25 | 1.03 × 10$^{-5}$ | <1.00 × 10$^{-8}$ | 9.44 × 10$^{-6}$ | 1.06 × 10$^{-5}$ |
| Pre-Coat Medium: Zeolite ("IE-90") and Resin Mix ("PD-3" and "PD-1") | | | | |
| 0 (Start-Feed) | 1.69 × 10$^{-5}$ | 1.87 × 10$^{-5}$ | 1.08 × 10$^{-5}$ | 1.95 × 10$^{-5}$ |
| 10 | <1.00 × 10$^{-8}$ | <1.00 × 10$^{-8}$ | <1.00 × 10$^{-8}$ | <1.00 × 10$^{-8}$ |
| 20 | <1.00 × 10$^{-8}$ | <1.00 × 10$^{-8}$ | <1.00 × 10$^{-8}$ | <1.00 × 10$^{-8}$ |
| 30 | <1.00 × 10$^{-8}$ | <1.00 × 10$^{-8}$ | <1.00 × 10$^{-8}$ | <1.00 × 10$^{-8}$ |
| Pre-Coat Medium: Zeolite ("IE-90") | | | | |
| 0 (Start-Feed) | 2.51 × 10$^{-5}$ | 2.06 × 10$^{-5}$ | 1.18 × 10$^{-5}$ | 1.40 × 10$^{-5}$ |
| 10 | 1.57 × 10$^{-5}$ | <1.00 × 10$^{-8}$ | <1.00 × 10$^{-8}$ | 3.14 × 10$^{-6}$ |

As can be seen from the experimental data set forth in Table V, the pre-coat medium of the present invention was dramatically effective in reducing the concentration of the identified isotopes over the course of the experiment conducted with that medium. Thus in terms of the so-called "Decontamination Factor", i.e., the ratio of influent radioactivity over effluent radioactivity, the pre-coat medium of the present invention exhibited a Decontamination Factor of 1,000/1 over the entire course of the experiment with respect to each of the isotopes measured, namely, Cobalt$^{60}$, Zinc$^{65}$, Cesium$^{134}$ and Cesium$^{137}$. In addition, in the case of the isotope cobalt$^{60}$, the pre-coat medium of the present invention proved to be unexpectedly superior over either the zeolitic material alone or the conventional resin/fiber material alone, in the length of time over which it provided an acceptable effluent radioactivity level.

In another experiment, conducted in the same test apparatus and in substantially the same manner as the four experiments previously described, a synthetic inorganic zeolitic material of the silicate type was used instead of the natural inorganic zeolitic material to prepare a zeolite-resin pre-coat composition in accordance with the invention. Specifically, the zeolitic material was a powdered zeolitic material of the silicate type which is commercially available, and was obtained, from the Linde Division of Union Carbide Corporation under the trade designation, "S-115". The ion-exchange resin component of the pre-coat composition consisted of the same 1:2 weight admixture of "PD-3" and "PD-1" powdered ion-exchange resins previously described in connection with the experiment reflected in the data of Table III. The ratio by weight of the zeolitic material component to the ion-exchange resin material component of the pre-coat composition was 1:3. Except for the substitution of the synthetic zeolitic material for the natural zeolitic material, the experiment was in all respects conducted in a manner substantially identical to that of the prior corresponding experiment with the natural zeolite-resin pre-coat medium.

In order to demonstrate the effectiveness of the foregoing pre-coat composition for the removal of certain organic materials, as well as radioactivity, periodic samples of the influent and effluent streams were analyzed to determine their content of "Total Organic Carbons" ("T.O.C.") as indicative of the concentration of such organic materials. The following results were obtained:

TABLE VI

Pre-Coat Medium: Synthetic Zeolite ("S-115") and Resin Mix ("PD-3" and "PD-1")

| Sample Time (elapsed minutes) | Conductivity (micromhos per cm. at 25° C.) | Total Organic Carbon (parts per billion) |
|---|---|---|
| Influent | 1.1 | 469 |
| 2 | .73 | 265 |
| 7 | .45 | 229 |
| 12 | .55 | 266 |

As can be seen from the foregoing experimental results, the pre-coat composition of the present invention, when utilizing a synthetic zeolitic material of the silicate type, is effective for the removal of organic materials as well as for the removal of radioactivity.

Three additional experiments were conducted. Two of these were undertaken to further illustrate the unexpected superiority of one zeolitic material/ion exchange resin material pre-coat composition of the present invention over an equivalent and conventional ion exchange resin material pre-coat composition free of zeolitic material. The third was conducted to demonstrate the effectiveness of a pre-coat composition in accordance with another embodiment of the invention, specifically, a pre-coat composition consisting of a mixture of a powdered zeolitic material and a powdered strongly basic anion exchange resin. These three experiments also illustrate the synergistic results provided by at least one type of novel pre-coat composition.

In one experiment reflecting the practice of the present invention, the novel pre-coat composition consisted, on a dry basis, of an admixture of one part by weight of powdered "Zeolite IE-90", as previously identified and described; one part by weight of powdered "PD-3" strongly acidic cation exchange resin, as previously identified and described; and two parts by weight of powdered "PD-1" strongly basic anion exchange resin, as previously identified and described. The equivalent and conventional pre-coat composition utilized in the second experiment consisted, on a dry basis, of one part by weight of the same powdered "PD-3" Resin and one part by weight of the same powdered "PD-1" Resin, but without any zeolitic material. In the third experiment, the novel pre-coat composition consisted of one part by weight of the same powdered "Zeolite IE-90" and one part by weight of the same powdered "PD-1" Resin, again on a dry basis. None of the pre-coat compositions contained any alpha-cellulose fibrous material.

These three additional experiments were conducted in the same type of test apparatus and in substantially the same manner as the experiments previously described, except that an effort was made to apply approximately the same weight of flocculated pre-coat medium, on a dry basis, to the filter element in each case. The fluid feed stream consisted of a solution of cesium chloride in demineralized water, and exhibited a conductivity of about 7.7 micromhos per centimeter at 25° C. Except for the effort to achieve approximately the same dry weight of flocculated pre-coat medium on the filter element in each case, the experiments were in all respects conducted in a manner substantially identical to the prior experiments reflected by the data set forth in Tables I through IV. The following results were obtained:

TABLE VII

Pre-Coat Medium: Zeolite ("IE-90") and Resin Mix ("PD-3" and "PD-1")
Wt. of Pre-coat: 1.0 gm. (Dry)

| Sample Time (elapsed minutes) | Conductivity (micromhos per cm. at 25° C.) | Flow Rate (mls. per min.) |
|---|---|---|
| 0 (Start) | 7.7 (Feed) | — |
| 5 | 0.45 | 40 |
| 10 | 0.17 | — |
| 15 | 0.083 | 40 |
| 20 | 0.069 | — |
| 25 | 0.067 | 50 |
| 30 | 0.063 | — |
| 35 | 0.062 | 50 |
| 40 | 0.062 | — |
| 45 | 0.060 | 52 |
| 50 | 0.062 | — |
| 55 | 0.060 | 52 |
| 60 | 0.060 | — |
| 65 | 0.059 | 60 |
| 70 | 0.059 | — |
| 75 | 0.059 | 60 |
| 80 | 0.060 | — |
| 85 | 0.060 | 60 |
| 90 | 0.061 | — |
| 95 | 0.062 | 60 |
| 100 | 0.063 | — |
| 105 | 0.065 | 60 |
| 110 | 0.066 | — |
| 115 | 0.068 | 60 |
|  | [0.070] | * |
| 120 | 0.072 | — |

*Total "clean" effluent = 5102 mls.

TABLE VIII

Pre-Coat Medium: Resin Mix ("PD-3" and "PD-1")
Wt. of Pre-coat: 0.8 gms. (Dry)

| Sample Time (elapsed minutes) | Conductivity (micromhos per cm. at 25° C.) | Flow Rate (mls. per min.) |
|---|---|---|
| 0 (Start) | 7.7 (Feed) | — |
| 5 | 0.085 | — |
| 10 | 0.063 | 64 |
| 15 | 0.061 | — |
| 20 | 0.064 | 64 |
| 25 | 0.064 | — |
| 30 | 0.065 | 64 |
| 35 | 0.068 | — |

TABLE VIII-continued

Pre-Coat Medium: Resin Mix ("PD-3" and "PD-1")
Wt. of Pre-coat: 0.8 gms. (Dry)

| Sample Time (elapsed minutes) | Conductivity (micromhos per cm. at 25° C.) | Flow Rate (mls. per min.) |
|---|---|---|
| — | [0.070] | * |
| 40 | 0.071 | 65 |
| 45 | 0.075 | — |

*Total "clean" effluent = 1920 mls.

TABLE IX

Pre-Coat Medium: Zeolite ("IE-90") and Anion Resin ("PD-1")
Wt. of Pre-coat: 0.9 gms. (Dry)

| Sample Time (elapsed minutes) | Conductivity (micromhos per cm. at 25° C.) | Flow Rate (mls. per min.) |
|---|---|---|
| 0 (Start) | 7.7 (Feed) | — |
| 5 | 0.12 | — |
| 10 | 0.087 | 40 |
| 15 | 0.086 | — |
| 20 | 0.085 | 40 |
| 25 | 0.084 | — |
| 30 | 0.088 | 40 |
| 35 | 0.093 | — |

From a comparison of the data in Table VII with those in Table VIII, it will be seen that the novel pre-coat method and composition of the present invention (Table VII) produced an acceptable effluent quality (i.e., with a conductivity not greater than 0.070 micromhos per centimeter at 25° C.) for a substantially longer period of time than the equivalent conventional pre-coat composition (Table VIII). IN fact, on the basis of the above-stated acceptable effluent quality and a unit weight of pre-coat medium, the pre-coat method and composition of the present invention unexpectedly exhibited a cesium removal capacity more than double that of the equivalent conventional pre-coat composition (i.e., 5102 mls./gm. vs. 2400 mls./gm.).

When other pre-coat compositions in accordance with the invention are utilized in accordance with the method of the invention, substantially similar results are achieved.

To further illustrate the unexpected superiority of a variety of zeolite and ion exchange resin pre-coat compositions that are disclosed and claimed herein in the removal of ions other than cesium, a series of eleven (11) further experiments, encompassing six (6) experimental pre-coat compositions and five (5) control compositions was evaluated.

The first experiment was conducted in accordance with prior practice whereby a conventional pre-coat medium consisting of an admixture of one part by weight of a commercially-available powdered strongly acidic cation exchange resin, in the hydrogen form, identified hereinabove as "PD-3" resin, and one part by weight of a commercially available powdered strongly basic anion exchange resin, identified hereinabove as "PD-1" resin, was utilized to filter cobalt and strontium-containing solutions of known concentration. The conventional pre-coat material described hereinabove employed no zeolitic materials. In this and some other experiments in the series, the filter element consisted of a pre-tared sheet of Whatman #41 filter paper supported and mounted in an in-line filter holder available from the Millipore Corporation. The pre-coat composition was prepared by blending the individual ion exchange resins, previously reduced in particle size by conventional techniques and apparatus. A slurry containing about 4.0 weight percent of the powdered solids in water was prepared in a blending tank. The pre-coat composition was applied to the filter element by recirculating the well-mixed slurry through the septum and allowing the suspended material to pre-coat the septum in accordance with the procedures identified in the foregoing experiments. Following completion of the loading of the pre-coat material, the filter element was positioned in the main conduit of the test apparatus. A solution containing 1.2 ppm of strontium and 1.3 ppm of cobalt was introduced into the filter inlet and its rate of flow was controlled by a valve positioned in the conduit downstream of the pre-coated filter element and was maintained at 40 mls/minute. The effluent stream was periodically tested utilizing a direct current plasma emission spectrophotometer and procedures well-known in the art. The experimental results for the conventional ion exchange pre-coat composition are set forth in Table X.

TABLE X

Pre-Coat Medium: Resin Mix ("PD-3" and "PD-1")
Weight of Precoat: 0.8 gm. (dry)

| Sample Time (Elasped Minutes) | Cobalt (ppm) | Strontium (ppm) | Flow Rate (mls. per min.) |
| --- | --- | --- | --- |
| 0 (Start) | 1.3 (Feed) | 1.2 (Feed) | — |
| 15 | <0.010 | <0.010 | 40 |
| 45 | <0.010 | <0.010 | 40 |
| 115 | 0.048 | 0.026 | 40 |

The second experiment, reflecting the practice of the invention, employed a pre-coat composition consisting of an admixture of one part by weight of Zeolite "A-50", one part by weight of Zeolite "X-60", two parts by weight of the strongly acidic cation exchange resin, "PD-3," identified above, and four parts by weight of the strongly basic anion exchange resin, "PD-1", also identified above. Zeolite "A-50" is an alkali metal alumino silicate of the type "A" crystal structure that is supplied as a sodium salt, and which is commercially available from the Linde division of Union Carbine Company. Zeolite "X-60" is an alkali metal alumino silicate cf the type "X" crystal structure that is supplied as a sodium salt, and which is also available from the Linde Division of the Union Carbide Company. The zeolite and ion exchange resin pre-coat composition was produced in full conformity with the procedures described in this Specification. As in the preceding experiment a solution containing 1.2 ppm of strontium and 1.3 ppm of cobalt was introduced through the inlet of the filter element. The effluent was then periodically measured by direct current plasma emission spectrophotometry. The results obtained in this experiment are recorded in Table XI below

TABLE XI

Pre-Coat Medium: Zeolites ("A-50" and "X-60") and
Resin Mix ("PD-3" and "PD-1")
Weight of Precoat: 0.8 gm. (dry)

| Sample Time (Elasped Minutes) | Cobalt (ppm) | Strontium (ppm) | Flow Rate (mls. per min.) |
| --- | --- | --- | --- |
| 0 (Start) | 1.3 (Feed) | 1.2 (Feed) | — |
| 5 | — | — | 100 |
| 10 | 0.014 | <0.010 | 40 |

TABLE XI-continued

Pre-Coat Medium: Zeolites ("A-50" and "X-60") and
Resin Mix ("PD-3" and "PD-1")
Weight of Precoat: 0.8 gm. (dry)

| Sample Time (Elasped Minutes) | Cobalt (ppm) | Strontium (ppm) | Flow Rate (mls. per min.) |
| --- | --- | --- | --- |
| 20 | 0.016 | <0.010 | 40 |
| 40 | 0.020 | <0.010 | 40 |
| 60 | 0.024 | <0.010 | 40 |
| 120 | 0.027 | <0.010 | 40 |

After approximately 2 hours of elapsed filtration time the pre-coat composition of the present invention produced an effluent having a cobalt concentration of nearly one-half (½) of that produced by the conventional pre-coat composition, as may be determined by comparing the data in Tables X and XI. Strontium concentrations recorded after approximately 2 hours of elapsed filtration time for the pre-coat composition of the present invention never exceeded the lower limit of detection of the test methodology of 0.010 ppm, while the strontium concentration recorded for a lesser total volume of effluent filtered through the conventional pre-coat composition reached 0.026 ppm. The results of these two experiments therefore show a significantly and unexpectedly superior cobalt and strontium removal capacity for the pre-coat composition of the present invention when compared with a conventional pre-coat composition.

Nine additional experiments were planned and carried out as shown in Table XII, to demonstrate that zeolite-containing pre-coat compositions ranging from 25% a by weight up to 75% by weight (dry weight) zeolitic material provide significantly and unexpectedly superior removal of cobalt from concentrated liquid solutions even in the presence of strontium ions which compete for binding sites on the cationic materials.

These additional pre-coat compositions employed a variety of ion-exchange resin materials selected from the group consisting of (a) an admixture of a strongly acidic cation exchange resin and a strongly basic anion exchange resin; (b) an admixture of a weakly acidic cation exchange resin and a strongly basic anion exchange resin; (c) ar admixture of a strongly acidic cation exchange resin and a weakly basic anion exchange resin; and (d) a strongly basic anion exchange resin. Strontium ions compete strongly with cobalt ions for exchange sites both on the cation exchange resins and the zeolites. Effective clearance rates for cobalt, a troublesome ion in radioactive waste streams, were nevertheless obtained despite the competition for charge sites due to the high levels of strontium present.

The experiments were conducted utilizing solutions of exceedingly high initial cobalt and strontium concentrations, and are reported in Tables XIII through XVI. The concentrations of cobalt and strontium employed are much higher, 500 to 1000 times higher, than might normally be found in radioactive waste streams. By combining a small overall pre-coat filtration surface area with the initial high cobalt and strontium ion concentrations, it was possible to rapidly ascertain whether the experimental pre-coat formulations of the invention were capable of removing cobalt ions, in the presence of strontium ions, substantially and to an unexpectedly much superior degree than equivalent comparable prior art ion exchange resin formulations.

TABLE XII

| | (a) Strongly Acidic Cation Exchange Resin ("PD-3") Plus Strongly Basic Anion Exchange Resin ("PD-1") | (b) Weakly Acidic Cation Exchange Resin ("AMBERLITE IRC-50") Plus Strongly Basic Anion Exchange Resin ("PD-1") | (c) Weakly Basic Anion Exchange Resin ("DUOLITE S-340") Plus strongly acidic Cation Exchange Resin ("PD-3") | (d) Strongly Basic Anion Exchange Resin ("PD-1") |
|---|---|---|---|---|
| Zeolite 25% (wt.) | — | Experimental Run [A] 25% Zeolite A-50/ X-60 (1:1) 25% AMBERLITE IRC-50 (cation) 50% PD-1 (anion) | — | — |
| Zeolite 50% (wt.) | — | — | — | Experimental Run [B-1] 50% Zeolite A-50 50% PD-1 (anion) Experimental Run [B-2] 50% Zeolite A-50/ X-60 (1:1) 50% PD-1 (anion) |
| Zeolite 68% (wt.) | Experimental Run [C] 68% Zeolite A-50 6% PD-3 (cation) 26% PD-1 (anion) | — | — | — |
| Zeolite 75% (wt.) | — | — | Experimental Run [D] 75% Zeolites A-50/ X-60 (1:1) 5% PD-3 (cation) 20% DUOLITE S-340 (anion) | — |
| No Zeolite (Ion Exchange Resin Controls) | Experimental Run [E-2] 75% PD-3 (cation) 25% PD-1 (anion) | Experimental Run [E-3] 50% AMBERLITE IRC-50 50% PD-1 (anion) | Experimental Run [E-4] 80% PD-3 (cation) 20% DUOLITE S-340 (anion) | Experimental Run [E-1] 50% PD-3 (cation) 50% PD-1 (anion) |

In each of the nine experiments, the zeolites and ion exchange resin powders were blended and thereafter slurried with deionized water. In experimental runs B-1, B-2 and E-1 the filter element consisted of a pre-tared sheet of Whatman #41 filter paper supported and mounted in an in-line filter holder available from the Millipore Corporation. Pre-coat weights ranged from about 0.94 to about 1.30 grams (dry weight). In experimental runs A, C, D, E-2, E-3 and E-4 the filtration apparatus consisted of a plastic column of approximately ⅝ inch cross-sectional diameter containing a porous stainless steel septum having a 25 micron pore size. An amount of slurry equivalent to about 0.2–0.3 grams (dry weight) of the pre-coat composition was applied to the top surface of the filter holder or septum by recirculating the slurry until the desired amount of pre-coat composition was deposited. The flocculated pre-coat filtration bed utilized in this set of experimental runs was comparable in depth to the filtration bed utilized in the preceding experiments although of smaller surface area by virtue of the smaller amount of pre-coat composition utilized. The amount of pre-coat filtration medium utilized generally proportionately corresponds to the larger filtration beds employed commercially which utilize approximately 0.2 lb. (dry weight) of pre-coat composition per square foot of filtration area.

Pre-coat compositions containing the above-described zeolites identified as "A-50" and "X-60" were prepared by blending one or both of the zeolites with different combinations of a strongly basic anion exchange resin of the type described aboVe as "PD-1", a strongly acidic cation exchange resin of the type described above as "PD-3", a weakly acidic cation exchange resin having carboxylic acid groups designated as AMBERLITE IRC-50 which is available from Rohm & Haas Company, or a weakly basic anion exchange resin having as its principal functional groups primary, secondary and tertiary amines, which is designated as DUOLITE S-340 and which is available from Diamond Shamrock (Rohm & Haas Company). The variation in the pre-coat formulations is shown in Table XII. The ion-exchange resin components of the pre-coat composition were separately added to the zeolitic component and blended by conVentional techniques.

Experiments A through E-4 as listed on Tables XIII through XVI were performed utilizing an aqueous solution of cobaltous chloride and strontium chloride. The initial influent concentrations of cobalt and strontium applied to the experimental and control pre-coat compositions ranged from 0.3 to 2.8 ppm cobalt, and from 0.5 to 4.7 ppm strontium, as indicated in Tables XIII through XVI.

As a measure of acceptable cobalt clearance, an operating capacity of ten percent (10%) of the initial influent concentration was selected. Accordingly, once the concentration of cobalt in the effluent reached 10% of the initial influent concentration the operating capacity of the pre-coat filtration bed for cobalt was deemed to be extinguished. The total filtration capacity may thus be expressed in mEq (milliequivalents) of cobalt per dry gram of cation exchange material (ion exchange resin and/or zeolitic material) ir the pre-coat. Tables XIII through XVI present the total number of mEq of cobalt removed by each pre-coat composition in solutions containing competing strontium ions, expressed in mEq of cobalt per gram (dry weight) of cationic material in the pre-coat, as calculated at the operating capacity breakpoint (10% of influent cobalt concentration found in the effluent). The experimental runs with pre-coat compositions corresponding to the formulations of the invention are identified as A, B-1, B-2, C and D. Runs with control formulations without zeolites are labeled E-1 through E-4.

In runs E-2 and E-4 the operating capacity breakpoint of ten percent (10%) of the influent cobalt concentration was exceeded at the first determination point and, therefore, the control pre-coat composition was deemed unsatisfactory for cobalt removal from liquid waste streams.

Side-by-side comparisons of the experimental pre-coat compositions of the invention to control pre-coat compositions of the conventional type containing analogous amounts of strongly basic or weakly basic anionic exchange resins admixed with cation ion exchange resins wholly replacing the zeolitic materials in the experimental compositions, demonstrate that the experimental formulations of the invention exhibit unexpected superiority in the removal of cobalt ions from liquid waste streams in the presence of strontium ions competing for binding sites on the pre-coat composition. Control formulation E-2 containing 25% by weight (dry) of strongly basic anion exchange resin totally failed by exceeding the operating capacity breakpoint of ten percent (10%) of the influent cobalt concentration at the initial reading as indicated on Table XIII. The E-2 composition may be generally compared to Experimental formulation "C" containing 68% by weight of Zeolite A-50 and 6% by weight of strongly acidic cation exchange resin "PD-3" (for a total of ca. 74% a by weight (dry)). The Experimental "C" formulation greatly outperformed the control composition by removing 0.610 mEq Co per g (dry) of cationic material (zeolite and strongly acidic cation exchange resin). In a commercial large-scale application this cobalt clearance efficiency could translate into a total filtration capacity of up to 212,079 gallons per square foot of filtration area assuming a pre-coat loading of 0.2 lb per square foot, the absence of insoluble matter and a cobalt concentration of about 1 ppm in the radioactive waste water.

TABLE XIII

| Run | Formulation (wt. basis) | Initial Co Conc. (ppm) | Initial Sr Conc. (ppm) | Total mEq Co/g(dry) Cationic Material | Projected Filtrate Vol. Gallons/ Sq. Ft. |
|---|---|---|---|---|---|
| | | Experimental | | | |
| C | 68% Zeolite A-50 6% PD-3 26% PD-1 | 1.3 | 1.5 | 0.610 | 212,079 |
| | | Control | | | |
| E-2 | 75% PD-3 25% PD-1 | 2.8 | 4.6 | BREAK | — |

Note:
BREAK signifies an initial effluent cobalt concentration greater than 10% of the influent concentration of the cobalt solution to be filtered.

As in the case of Run E-2, Run E-4 utilizing a control formulation comprising 80% by weight (dry) of strongly acidic cation exchange resin plus 20% by weight (dry) of a weakly basic anion exchange resin likewise failed initially by allowing cobalt leakage of greater than ten percent (10%) of the influent concentration, thus surpassing the operating capacity breakpoint. (See Table XIV). The corresponding experimental formulation, "D", however, cleared 0.187 mEq of Co per g (dry) of cationic material when an equal mixture of Zeolite A-50 and X-60 was employed in the composition at a level of 75% by weight (dry) of the final pre-coat composition. As above, in a typical commercial application employing filtration units of much higher capacity, a total of 65,188 gallons per square foot of filtration area could be realized, again assuming a loading of pre-coat composition of 0.2 pounds per square foot and an initial cobalt level of 1 ppm.

TABLE XIV

| Run | Formulation (wt. basis) | Initial Co Conc. (ppm) | Initial Sr Conc. (ppm) | Total mEq Co/g(dry) Cationic Material | Projected Filtrate Vol. Gallons/ Sq. Ft. |
|---|---|---|---|---|---|
| | | Experimental | | | |
| D | 75% Zeolite A-50 5% PD-3 20% Duolite S-340 | 0.3 | 0.5 | 0.187 | 65,188 |
| | | Control | | | |
| E-4 | 80% PD-3 20% Duolite S-340 | 2.8 | 4.7 | BREAK | — |

Note:
BREAK signifies an initial effluent concentration greater than 10% of the influent concentration of the cobalt solution to be filtered.

The greatest overall clearance of cobalt was noted in experimental run "A" which utilized an admixture of 25by weight (dry) of weakly acidic cation resin, AMBERLITE IRC-50, 25% by weight (dry) of an equal blend of Zeolites A-50 and X-60 and 50% by weight (dry) strongly basic anion exchange resin PD-1 as reported in Table XV. In experimental run "A" a total of 1.17 mEq of Co per g (dry) of cationic material was removed. Assuming once more a larger commercial filtration set-up, a pre-coat loading of 0.2 pounds per square foot of filtration area and an initial cobalt level of 1 ppm, up to 406,775 gallons of radioactive waste water could be satisfactorily filtered per square foot of filtration area. Data for the control formulation employing 50% by weight (dry) of the weakly acidic cation exchange material, AMBERLITE IRC-50, and 50% by weight (dry) of the strongly basic anion exchange resin, "PD-1", yielded a total cobalt clearance figure of approximately one-half that of the experimental formulation, i.e.. 0.576 mEq of cobalt per g (dry) of cation material. Extrapolating these figures to a larger commercial filtration unit, a projected total volume of 200,258 gallons per square foot of filtration area might be expected under similar test conditions.

TABLE XV

| Run | Formulation (wt. basis) | Initial Co Conc. (ppm) | Initial Sr Conc. (ppm) | Total mEq Co/g(dry) Cationic Material | Projected Filtrate Vol. Gallons/ Sq. Ft. |
|---|---|---|---|---|---|
| | | Experimental | | | |
| A | 25% Zeolite A-50/X-60 (1:1) 25% Amberlite IRC-50 50% PD-1 | 2.9 | 4.6 | 1.17 | 406,775 |
| | | Control | | | |
| E-3 | 50% Amberlite IRC-50 50% PD-1 | 2.7 | 4.5 | 0.576 | 200,258 |

The remaining two experimental runs, B-1 and B-2, are reported on Table XVI. Each pre-coat formulation contained 50% by by weight (dry) of strongly basic anion exchange resin, "PD-1", plus 50% by weight (dry) of zeolitic material. In the B-1 formulation the zeolite utilized was Zeolite A-50 and for the B-2 formulation, an equal mixture of Zeolite A-50 and X-60. Total cobalt clearance figures of 0.058 and 0.606 mEq of cobalt per gram (dry) of cation material were recorded for formulations B-1 and B-2, respectively. Under the conditions discussed above, namely, a pre-coat loading of 0.2 pounds per square foot of filtration area, absence of insoluble material, and an initial cobalt content of 1 ppm, the calculated total volume of radioactive liquid waste water that could be filtered would be up to 20,304 and 10,549 gallons per square foot of filtration area for formulations B-1 and B-2, respectively. This contrasts markedly with the cobalt clearance figure of 0.0146 mEq of cobalt per gram (dry) of cation material recorded for the "E-1" control formulation composed of 50% by weight (dry) of strongly acidic cation exchange resin "PD-3" and 50% by weight (dry) strongly basic anion exchange resin "PD-1". Under similar test conditions as discussed above, a filtration capacity of only 5,076 gallons per square foot of filtration area would be projected before the operating capacity breakpoint was surpassed. Thus the experimental formulations of the invention greatly surpassed the conventional pre-coat ion exchange resin composition in the removal of cobalt from highly concentrated cobalt-containing solutions.

TABLE XVI

| Run | Formulation (wt. basis) | Initial Co Conc. (ppm) | Initial Sr Conc. (ppm) | Total mEq Co/g(dry) Cationic Material | Projected Filtrate Vol. Gallons/ Sq. Ft. |
|---|---|---|---|---|---|
| | | Experimental | | | |
| B-1 | 50% Zeolite A-50 50% PD-1 | 1.06 | 1.4 | 0.058 | 20,304 |
| B-2 | 25% Zeolite A-50 25% Zeolite X-60 50% PD-1 | 1.35 | 1.2 | 0.606 | 210,549 |
| | | Control | | | |
| E-1 | 50% PD-3 50% PD-1 | 1.04 | 1.3 | 0.0146 | 5,076 |

As described hereinabove, mixtures of zeolites with various combinations of strongly and weakly basic and acidic anion and cation exchange resins, containing zeolite contents of 25 to 75% by weight on a dry basis, substantially remove cesium, strontium and cobalt ions from aqueous solution to a degree not provided by comparable conventional ion exchange resin compositions not containing zeolites.

What is claimed is:

1. A composition useful as a pre-coat medium for purifying a liquid containing radioactive and/or other deleterious material, said composition being capable of flocculation in water and comprising: (A) a finely-divided zeolitic material and (B) a finely-divided ion-exchange resin material selected from the group consisting of: (a) an admixture of a strongly acidic cation exchange resin and a strongly basic anion exchange resin, (b) an admixture of a strongly acidic cation exchange resin and a weakly basic anion exchange resin, (c) an admixture of a weakly acidic cation exchange resin and a strongly basic anion exchange resin, and (d) a strongly basic anion exchange resin.

2. A composition according to claim 1, wherein the particle sizes of said finely-divided zeolitic material are in the range of from about one micron to about 80 microns, and wherein the particle sizes of said finely-divided ion-exchange resin material are in the range of from about 30 microns to about 250 microns.

3. A composition according to claim 1, wherein said finely-divided zeolitic material is a naturally-occurring inorganic zeolitic material.

4. A composition according to claim 1, wherein said finely-divided zeolitic material is a synthetic inorganic zeolitic material.

5. A composition according to claim 4, wherein said synthetic inorganic zeolitic material is a hydrogen zirconium phosphate.

6. A composition according to claim 4, wherein said synthetic inorganic zeolitic material is a zeolite of the silicate type.

7. A composition according to claim 1, wherein said finely-divided zeolitic material constitutes from about 25 to about 75 percent by weight of said composition.

8. A composition according to claim 1, wherein said finely-divided zeolitic material constitutes from about 25 to about 50 percent by weight of said composition.

9. A composition according to claim 1, wherein said finely-divided ion-exchange resin material is an admixture of a strongly acidic cation exchange resin and a strongly basic anion exchange resin and the weight ratio of said strongly acidic cation exchange resin to said strongly basic anion exchange resin is in the range of from about 1:9 to about 9:1.

10. A composition according to claim 1, wherein said finely-divided ion-exchange resin material is an admixture of a strongly acidic cation exchange resin and a weakly basic anion exchange resin and the weight ratio of said strongly acidic cation exchange resin to said weakly basic anion exchange resin is in the range of from about 1:9 to about 9:1.

11. A composition according to claim 1, wherein said finely-divided ion-exchange resin material is an admixture of a weakly acidic cation exchange resin and a strongly basic anion exchange resin, and the weight ratio of said weakly acidic cation exchange resin to said strongly basic anion exchange resin is in the range of from about 1:9 to about 9:1.

12. A composition according to claim 1, wherein said finely-divided ion-exchange resin material is a strongly basic anion exchange resin.

13. A composition according to claim 1, wherein said composition also includes a filter aid.

14. A composition according to claim 13, wherein said filter aid consists of alpha-cellulose fibers in finely-divided form.

15. A composition according to claim 1, wherein said composition also contains a floccing agent.

16. A composition according to claim 15, wherein said floccing agent is a polyelectrolyte.

17. A composition according to claim 1, wherein said strongly acidic cation exchange resin is in hydrogen form.

18. A composition according to claim 1, wherein said strongly basic anion exchange resin is in hydroxide form.

19. A composition according to claim 1, wherein said weakly acidic cation exchange resin is in hydrogen form.

20. A composition according to claim 1, wherein said weakly basic anion exchange resin is in hydroxide form.

* * * * *

UNITED STATES PATENT AND TRADEMARK OFFICE
CERTIFICATE OF CORRECTION

PATENT NO. : 4,927,796

DATED : May 22, 1990

INVENTOR(S) : Philip J. D'Angelo, Richard Hetherington and Joseph J. Rogan

It is certified that error appears in the above-identified patent and that said Letters Patent is hereby corrected as shown below:

```
Column 1, line 19, "be" should read -- by --.
Column 4, line 18, "hydrcchloric" should read -- hydrochloric --.
Column 4, line 44, "a" should read -- & --.
Column 5, line 28, "RA" should read -- IRA --.
Column 6, line 37, "cationic weakly" should read -- cationic:weakly --.
Column 6, line 41, "zeoliteion" should read -- zeolite:ion --.
Column 8, line 52, "90".in" should read -- "90", in --.
Column 10, line 54, "ndt" should read -- not --.
```
Column 11, line 13, "$1.00 \times 10^{-8}$" should read -- $<1.00 \times 10^{-8}$ --.
```
Column 16, line 34, "25% a by weight" should read -- 25% by weight --.
Column 16, line 45, "(c) ar" should read -- (c) an --.
Column 17, line 63, "aboVe" should read -- above --.
Column 18, line 42, "conVentional" should read -- conventional --.
Column 18, line 60, "ir" should read -- in --.
Column 19, line 20, after the word "composition.", a new paragraph
   should begin with the word "Control".
Column 20, line 27, "25by" should read -- 25% by --.
```

Signed and Sealed this

First Day of September, 1992

Attest:

DOUGLAS B. COMER

Attesting Officer     Acting Commissioner of Patents and Trademarks